(12) United States Patent
Konishi

(10) Patent No.: US 7,287,546 B2
(45) Date of Patent: Oct. 30, 2007

(54) SIMPLE STRUCTURE OF FUEL PRESSURE REGULATOR DESIGNED TO MINIMIZE PRESSURE LOSS

(75) Inventor: Masaaki Konishi, Chiryu (JP)

(73) Assignee: Denso Corporation (JP)

( * ) Notice: Subject to any disclaimer, the term of this patent is extended or adjusted under 35 U.S.C. 154(b) by 215 days.

(21) Appl. No.: 10/799,639

(22) Filed: Mar. 15, 2004

(65) Prior Publication Data

US 2004/0177884 A1    Sep. 16, 2004

(30) Foreign Application Priority Data

Mar. 14, 2003  (JP)  ............... 2003-070162
Mar. 14, 2003  (JP)  ............... 2003-070187
Feb. 13, 2004  (JP)  ............... 2004-036390

(51) Int. Cl.
*G05D 16/04*    (2006.01)
*F02M 69/54*    (2006.01)

(52) U.S. Cl. ............... 137/540; 137/539; 123/511; 251/337

(58) Field of Classification Search ............... 137/539, 137/540; 251/337; 123/511, 514
See application file for complete search history.

(56) References Cited

U.S. PATENT DOCUMENTS

| | | | |
|---|---|---|---|
| 5,177,860 A | | 1/1993 | Yura et al. |
| 5,241,984 A | | 9/1993 | Onjohji et al. |
| 5,564,397 A | * | 10/1996 | Kleppner et al. ............ 123/514 |
| 5,649,514 A | | 7/1997 | Okada et al. |
| 5,901,742 A | * | 5/1999 | Kleppner et al. ............ 137/508 |
| 6,293,259 B1 | * | 9/2001 | Kilgore et al. ............... 123/514 |
| 6,681,798 B2 | * | 1/2004 | Bueser et al. ................ 137/539 |
| 2001/0022193 A1 | * | 9/2001 | Schwegler et al. .......... 137/514 |

FOREIGN PATENT DOCUMENTS

| | | |
|---|---|---|
| DE | 198 14 744 A1 * | 10/1999 |
| DE | 10107223 A1 | 8/2002 |
| JP | 50-114620 | 9/1975 |
| JP | 51-126428 | 10/1976 |
| JP | 63-149888 | 6/1988 |
| JP | 4-37872 | 3/1992 |
| JP | 4-106714 | 4/1992 |
| JP | 4-337171 | 11/1992 |
| JP | 6-281034 | 10/1994 |
| JP | 9-152052 | 6/1997 |
| JP | 11-82240 | 3/1999 |
| JP | 2000-45897 | 2/2000 |

OTHER PUBLICATIONS

Japanese Office Action dated Aug. 1, 2006.

* cited by examiner

*Primary Examiner*—Ramesh Krishnamurthy
(74) *Attorney, Agent, or Firm*—Nixon & Vanderhye PC

(57) ABSTRACT

A fuel pressure regulator for use in internal combustion engines. The fuel pressure regulator includes a valve seat and a vale body disposed downstream of the valve seat and is designed to move the valve body away from the valve seat through the pressure of fuel applied directly to the valve body. This eliminates the need for a diaphragm and results in a simplified structure of the fuel pressure regulator.

8 Claims, 13 Drawing Sheets

FIG. 17(a) SYSTEM PRESSURE OF FUEL
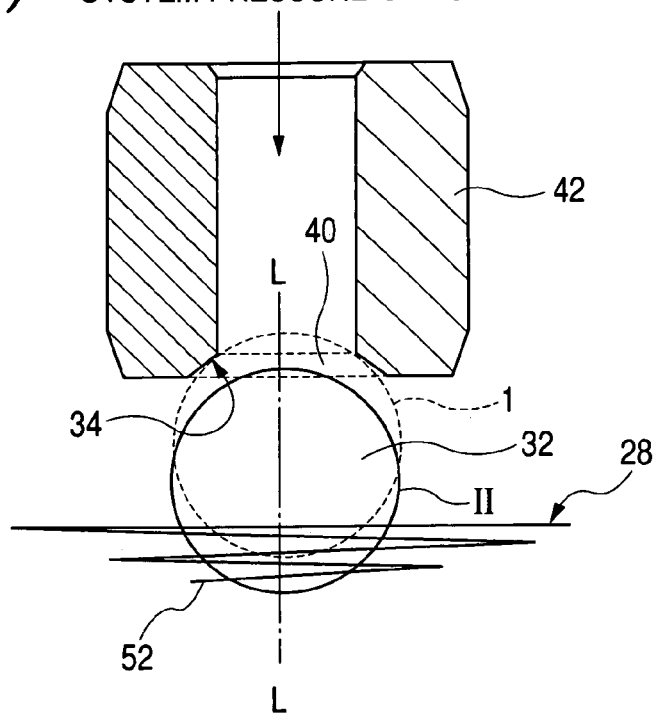
FIG. 17(b) SYSTEM PRESSURE OF FUEL
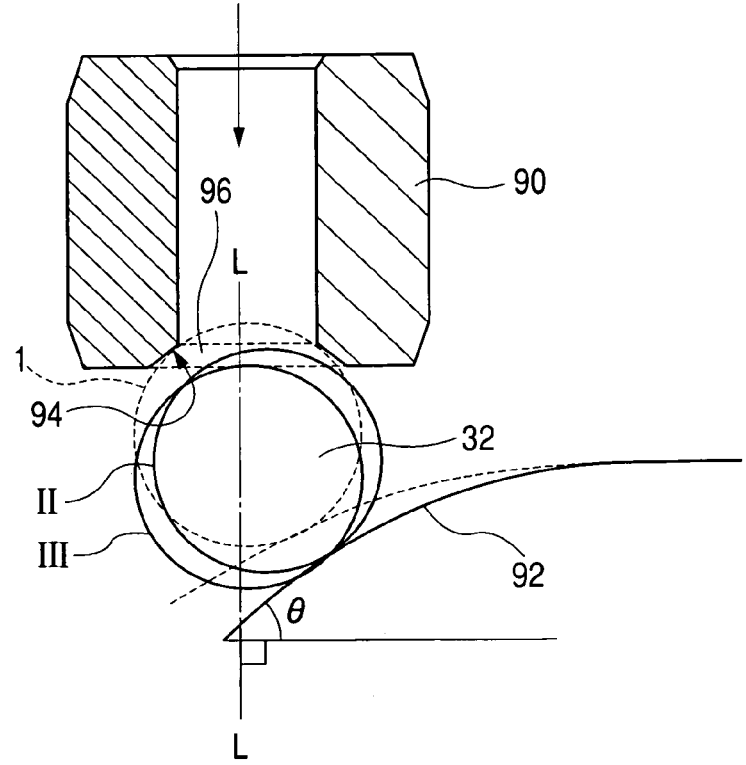

SIMPLE STRUCTURE OF FUEL PRESSURE REGULATOR DESIGNED TO MINIMIZE PRESSURE LOSS

BACKGROUND OF THE INVENTION

1. Technical Field of the Invention

The present invention relates generally to a fuel pressure regulator working to regulate the pressure of fuel supplied from a fuel tank to an internal combustion engine through a fuel pump, and more particularly to a simple structure of such a fuel pressure regulator designed to minimize a pressure loss of fuel.

2. Background Art

Japanese Patent First Publication No. 2000-45897 discloses a fuel pressure regulator which has a diaphragm working to move a valve body. The diaphragm is made of a rubber film for the purpose of achieving a hermetic seal within the pressure regulator. The diaphragm has an outer periphery retained entirely in a crimped end of a regulator housing to define two chambers in one of which the pressure of fuel works to open a valve body and in other of which no fuel pressure acts on the valve body. This type of pressure regulator requires two separate housings; one for hermetically sealing a chamber within which the fuel pressure works to open a valve body and the other for hermetically sealing a chamber within which no fuel pressure acts on the valve body, thus resulting in increased parts of the pressure regulator.

DE 101 07 224 A1 discloses a fuel pressure regulator designed to move a valve body away from a valve seat through the pressure of fuel exerted directly on the valve body without use of a diaphragm. The pressure regulator also has an L-shaped plate spring working to urge the valve body to close a fuel outlet formed in the valve seat. The fuel passes through an intricately curved flow path along the L-shaped plate spring located downstream of the fuel outlet, thus resulting in a loss of the fuel pressure.

SUMMARY OF THE INVENTION

It is therefore a principal object of the invention to avoid the disadvantages of the prior art.

It is another object of the invention to provide a simple structure of a fuel pressure regulator.

It is a further object of the invention to provide a fuel pressure regulator designed to minimize a pressure loss of fuel.

According to one aspect of the invention, there is provided a fuel pressure regulator for an internal combustion engine. The fuel pressure regulator comprises: (a) a housing having a fuel inlet and a fuel outlet, the fuel inlet being adapted to connect with a fuel delivery pipe through which fuel pumped out of a fuel tank is delivered to an internal combustion engine, the fuel outlet adapted to connect with the fuel tank; (b) a seat member disposed within the housing, the seat member having a flow path formed therein, a seat opening, and a valve seat formed around the seat opening, the flow path allowing the fuel to flow from the fuel inlet to the fuel outlet of the housing and leading to the seat opening; (c) a valve member disposed within the housing downstream of the valve seat of the seat member in a flow of the fuel through the flow path of the seat member, the valve member being adapted to abut on the valve seat to close the seat opening and to be moved upon application of pressure of the fuel flowing through the flow path of the seat member to open the seat opening for regulating the pressure of the fuel delivered to the internal combustion engine; and (d) an urging member working to urge the valve member into abutment with the valve seat to close the seat opening of the seat member. Specifically, the fuel pressure regulator is designed to move the valve member away from the valve seat through the pressure of fuel applied directly to the valve member without use of a diaphragm which is installed on some of the conventional structures, as discussed in the introductory part of this application, thus resulting in a simplified structure of the fuel pressure regulator.

In the preferred mode of the invention, the urging member is implemented by a plate spring which has an outer periphery retained by the housing. Use of the plate spring results in a simplified structure of the pressure regulator.

The plate spring has an opening which establishes a fluid communication between the seat opening of the seat member and the fuel tank.

The urging member may hold the valve member firmly thereon within the housing.

The plate spring may be retained by a crimped portion of the housing.

According to the second aspect of the invention, there is provided a fuel pressure regulator for an internal combustion engine which comprises: (a) a housing having a fuel outlet adapted to connect with a fuel tank; (b) a seat member having a fuel inlet, a seat opening, and a valve seat formed around the seat opening, the fuel inlet being adapted to connect with a fuel delivery pipe through which fuel pumped out of the fuel tank is delivered to an internal combustion engine, the seat opening establishing a fluid communication between the fuel inlet and the fuel outlet of the housing; (c) a valve member disposed between the valve seat of the seat member and the fuel outlet of the housing, the valve member being adapted to abut on the valve seat to close the seat opening and to be moved upon application of pressure of the fuel thereto to open the seat opening for regulating the pressure of the fuel delivered to the internal combustion engine; and (d) an urging member disposed at the fuel outlet of the housing to urge the valve member into abutment with the valve seat to close the seat opening of the seat member. Specifically, the fuel pressure regulator is designed to move the valve member away from the valve seat through the pressure of fuel applied directly to the valve member without use of a diaphragm which is installed on some of the conventional structures, as discussed in the introductory part of this application, thus resulting in a simplified structure of the fuel pressure regulator.

In the preferred mode of the invention, the urging member is implemented by a plate spring which has an outer periphery retained by the housing. Use of the plate spring results in a simplified structure of the pressure regulator.

The plate spring has an opening which establishes a fluid communication between the seat opening of the seat member and the fuel tank.

The urging member works to hold the valve member within the housing to avoid dislodgement of the valve member from the urging member.

The plate spring is retained by a crimped portion of the housing.

According to the third aspect of the invention, there is provided a fuel pressure regulator for an internal combustion engine which comprises: (a) a seat member a seat opening, and a valve seat formed around the seat opening, the seat opening leading to a fuel delivery pipe through which fuel pumped out of a fuel tank is delivered to an internal combustion engine; (b) a valve member disposed downstream of the valve seat of the seat member in a flow of the fuel, the valve member being adapted to abut on the valve seat to close the seat opening and to be moved upon application of pressure of the fuel thereto to open the seat opening for regulating the pressure of the fuel delivered to the internal combustion engine; and (c) a plate spring working to urge the valve member into abutment with the valve seat to close the seat opening of the seat member. The plate spring includes an outer portion retained to be stationary, an inner portion retained to be movable, at least one annular portion retained between the outer portion and the inner portion, and an outside and an inside joint portions. The outside joint portion connects the outer portion and the annular portion together. The inside joint portion connects the annular portion and the inner portion together. The outside and inside joint portions are opposed diametrically to each other across the center of the plate spring.

The valve member is, as described above, located downstream of the seat opening so as to diffuse the fuel from inside to outside the seat opening when the valve member is moved away from the valve seat, thereby minimizing a contracted flow of the fuel which may cause vapor of the fuel to occur leading to noisy vibrations of the pressure regulator. Use of the plate spring permits the structure of the pressure regulator to be reduced in size. Additionally, the above structure of the plate spring provides for accurate control of an opened area of the seat opening. Specifically, such accurate control is achieved by designing the plate spring so as to keep the inner portion on which the valve member is placed nearly perpendicular to a thickness-wise direction of the plate spring.

Application of the pressure of fuel to the center (i.e., the inner portion) of the plate spring in a thickness-wise direction causes the plate spring to be deformed into a three-dimensional zigzag form in which the plate spring is folded at the outside and inside joint portions, as illustrated in FIG. 16. If the angle between spring elements located inside and outside one of the inside and outside joint portions (e.g., the outer portion and the annular portion or the annular portion and the inner portion) is defined as θn where n=1, 2, 3, . . . k (e.g., θ1 to θ4 in FIG. 16), the angle θ which the outer portion makes with the inner portion (e.g., θ5 in FIG. 16) is approximated as if $k=2m, \theta=(\theta 2-\theta 1)+(\theta 4-\theta 3)+ \ldots +(\theta k-\theta k-1)$ if $k=2m+1, \theta=(\theta 1-\theta 2)+ \ldots +(\theta k-2-\theta k-1)+\theta k$ The above equations show that the structure of the spring plate serves to decrease the rate of increase in angle θ between the outer portion and the inner portion resulting from a stroke of the inner portion. Specifically, the plate spring works to keep the inner portion on which the valve member is placed nearly perpendicular to the thickness-wise direction of the plate spring, thus achieving the accurate control of an opened area of the seat opening. This enables the pressure of fuel flowing upstream of the seat opening to be controlled accurately.

In the preferred mode of the invention, the valve member is in abutment with the inner portion of the plate spring so as to be movable in a direction substantially perpendicular to a line extending in the thickness-wise direction of the plate spring. Alignment of the valve member with the center of the seat opening may be achieved only by urging the valve member toward the valve seat.

The fuel pressure regulator may also include a second annular portion disposed between the annular portion and the outer portion. The second annular portion is greater in rigidity than the annular portion. This results in uniform in distortion created in the annular portions.

According to the fourth aspect of the invention, there is provided a fuel pressure regulator for an internal combustion engine which comprises: (a) a seat member a seat opening, and a valve seat formed around the seat opening, the seat opening leading to a fuel delivery pipe through which fuel pumped out of a fuel tank is delivered to an internal combustion engine; and (b) a plate spring disposed downstream of the valve seat of the seat member in a flow of the fuel. The plate spring includes an outer portion retained to be stationary, an inner portion retained to be movable, at least one annular portion retained between the outer portion and the inner portion, and an outside and an inside joint portions. The inner portion is adapted to abut on the valve seat to close the seat opening and to be moved upon application of pressure of the fuel thereto to open the seat opening for regulating the pressure of the fuel delivered to the internal combustion engine. The outside joint portion connects the outer portion and the annular portion together. The inside joint portion connects the annular portion and the inner portion together. The outside and inside joint portions is opposed diametrically to each other across the center of the plate spring.

In the preferred mode of the invention, the fuel pressure regulator may also include a second annular portion disposed between the annular portion and the outer portion. The second annular portion is greater in rigidity than the annular portion.

According to the fifth aspect of the invention, there is provided a fuel pressure regulator for an internal combustion engine which comprises: (a) a seat member a seat opening, and a valve seat formed around the seat opening, the seat opening leading to a fuel delivery pipe through which fuel pumped out of a fuel tank is delivered to an internal combustion engine; (b) a valve member disposed downstream of the valve seat of the seat member in a flow of the fuel, the valve member being adapted to abut on the valve seat to close the seat opening and to be moved upon application of pressure of the fuel thereto to open the seat opening for regulating the pressure of the fuel delivered to the internal combustion engine; and (c) a plate spring working to urge the valve member into abutment with the valve seat to close the seat opening of the seat member. The plate spring includes an outer portion retained to be stationary, a center portion abutting the valve member and retained to be movable, and at least two spring portions retained between the outer portion and the center portion. Each of the spring portions has a first end joined to the outer portion and a second end joined to the center portion. The second ends are joined to an outer periphery of the center portion at equi-angular intervals. This keeps the center portion oriented nearly perpendicular to the thickness-wise direction of the plate spring, thus achieving accurate control of an opened area of the seat opening.

In the preferred mode of the invention, the valve member is in abutment with the center portion of the plate spring so as to be movable in a direction substantially perpendicular to a line extending in the thickness-wise direction of the center portion.

The spring portions of the plate spring are of a zigzag shape, thereby resulting in an increased length of the spring portions.

The spring portions of the plate spring may alternatively be of a spiral shape, thereby resulting in an increased length of the spring portions.

Each of the spring portions may have rigidity which increases from the second end to the first end.

According to the sixth aspect of the invention, there is provided a fuel pressure regulator for an internal combustion engine which comprises: (a) a seat member a seat opening, and a valve seat formed around the seat opening, the seat opening leading to a fuel delivery pipe through which fuel pumped out of a fuel tank is delivered to an internal combustion engine; and (b) a plate spring disposed downstream of the valve seat of the seat member in a flow of the fuel. The plate spring includes an outer portion retained to be stationary, a center portion adapted to abut on the valve seat to close the seat opening of the seat member and retained to be movable, and at least two spring portions retained between the outer portion and the center portion. Each of the spring portions has a first end joined to the outer portion and a second end joined to the center portion. The second ends being joined to an outer periphery of the center portion at equi-angular intervals.

In the preferred mode of the invention, the spring portions of the plate spring are of a zigzag shape.

The spring portions of the plate spring may alternatively be of a spiral shape.

Each of the spring portions may have rigidity which increases from the second end to the first end.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 17(a) is a partially sectional view which shows movement of a valve ball of a fuel pressure regulator of the invention;

FIG. 17(b) is a partially sectional view which shows a comparative example;

DESCRIPTION OF THE PREFERRED EMBODIMENTS

Figure 1:
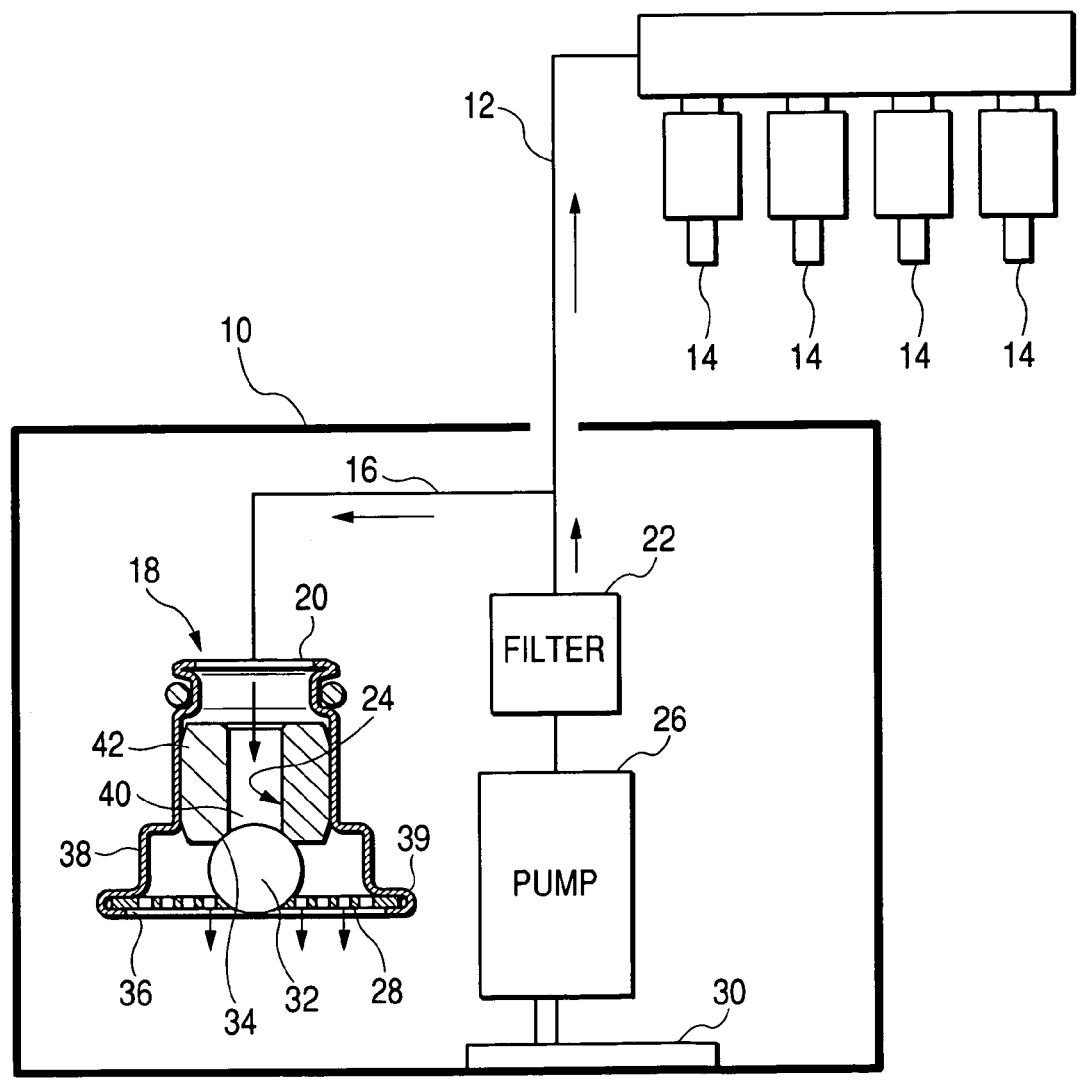
FIG. 1 is a schematic illustration which shows an automotive fuel delivery system equipped with a fuel pressure regulator according to the first embodiment of the invention.

Referring to the drawings, wherein like reference numbers refer to like parts in several views, particularly to FIG. 1, there is shown a fuel pressure regulator 18 according to the first embodiment of the invention which may be employed in automotive vehicles. The following discussion will refer, as an example, to such use.

The fuel pressure regulator 18 works to regulate the pressure of fuel which is pumped by a fuel pump 26 out of a fuel tank 10 and delivered to fuel injectors 14 installed in an internal combustion engine.

The fuel pump 26 is, as clearly shown in the drawing, of an in-tank type. Specifically, the fuel pump 26 is installed within the fuel tank 10 and has a fuel inlet to which a suction filter 30 is connected and a fuel outlet to which a fuel filter 22 is connected. The fuel pump 26 works to suck the fuel through the suction filter 30 from the fuel tank 10 and discharge it to the injectors 14 through the fuel filter 22.

The fuel pressure regulator 18 is joined to a fuel delivery pipe 16 which extends from a return pipe 12 through which the fuel flows from the fuel filter 22 to the injectors 14. The fuel pressure regular 18, as can been seen from FIG. 2, includes a housing 38, a seat body 42, a valve ball 32, and a plate spring 28.

The housing 38 is made of a metallic hollow cylinder which has a fuel inlet 20 leading to the fuel delivery pipe 16 and a fuel outlet 36 leading to inside the fuel tank 10. The fuel enters the fuel inlet 20 from the fuel delivery pipe 16.

The seat body 42 is made of a metallic hollow cylinder and press fit within the housing 38. The seat body 42 has an inner wall 24 defining a fuel path and a valve seat 34 formed on a downstream corner (i.e., a lower corner, as viewed in the drawing) of the inner wall 24. The valve seat 34 defines a seat opening 40 which works as an outlet of the seat body 42 leading to the fuel inlet 20 and the fuel outlet 36 of the housing 38.

The valve ball 32 is made of metal and urged into constant abutment with the valve seat 34 by the plate spring 28 within the housing 38. Specifically, the valve ball 32 is sized to close the seat opening 40 upon abutment on the valve seat 34. The valve ball 32 is caught in a circular opening 70, as clearly shown in FIG. 2, of the plate spring 28.

The plate spring 28 is installed in the fuel outlet 36 of the housing 38. The installation is achieved by crimping an outlet end 39 of the housing 38 inwardly. The plate spring 28 is, as clearly shown in FIGS. 2 and 3, made of an elastic plate having a circular profile and consists of a plurality of annular strips 44, 46, 48, 50, and 52 arrayed coaxially with each other and joint portions 54, 56, 66, and 68 connecting between adjacent two of the annular strips 44, 46, 48, 50, and 52. The plate spring 28 has formed therein coaxially arrayed C-shaped slits 58, 60, 62, and 64 and the circular opening 70. The circular opening 70 is formed in the center of the plate spring 28. Each of the annular strips 46, 48, and 50 has one of the joint portions 54 to 68 used to establish a mechanical joint to an outside one of the annular strips 44 to 52 and 180° opposed one of the joint portions 54 to 68 used to establish a joint to an inside one of the annular strips 44 to 52. The width and/or thickness of each of the annular strips 44 to 52 may be either uniform or nonuniform over a length thereof. Additionally, of adjacent two of the annular strips 44 to 52, an outside one may be greater in width and/or thickness than an inside one for increasing the rigidity thereof.

Figure 4:
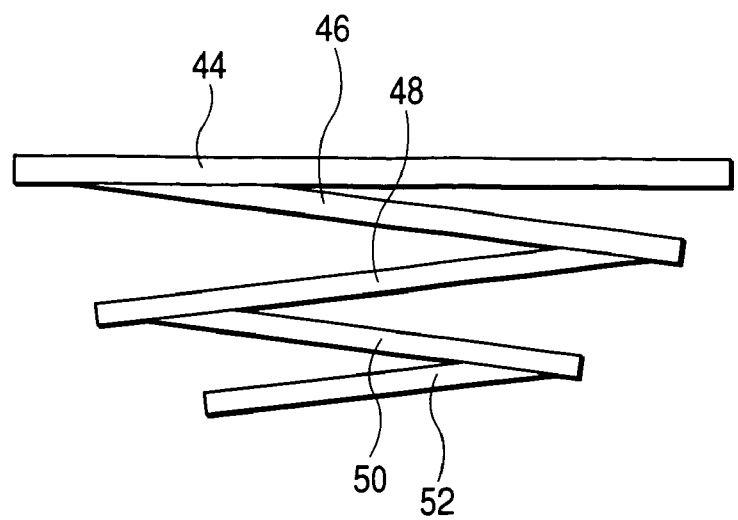
FIG. 4 is a side view which shows a plate spring undergoing a stroke when a fuel pressure regulator is opened.

When pressure is exerted on the center of the plate spring 28 in a thickness-wise direction thereof (i.e., a direction perpendicular to the drawing), it will cause the plate spring 28 to be deformed elastically or undergo a stroke, as clearly shown in FIG. 4. Specifically, the plate spring 28 works to urge the valve ball 32 toward the valve seat 34 at all the time.

Instead of the plate spring 28, a coil spring may be used to bias the valve ball 32 to the valve seat 34, but however, use of a thin flat spring, like the plate spring 28, permits the fuel pressure regulator 18 to be decreased in length and also simplified in structure. The installation of the plate spring 28 in the housing 38 may alternatively be achieved using screws, however, the crimping of the outlet end 39 of the housing 38, as described above, results in a simplified structure of the fuel pressure regulator 18.

The formation of the C-shaped slits 58, 60, 62, and 64 in the plate spring 28 installed downstream of the valve seat 34 results in simplified fuel path through which the fuel flowing from the seat opening 40 goes out of the fuel outlet 36. This permits the housing 38 to be so structured, as can be seen from FIG. 1, as to define a straight flow path extending along a longitudinal center line of the housing 38. The housing 38 has, as clearly illustrated in FIG. 1, a wider downstream end wall which defines a wider area of the fuel outlet 36, thus allowing the slits 58, 60, 62, and 64 of the plate spring 28 to be increased in area. This leads to a decreased loss of the pressure of the fuel flowing from the valve seat 34 out of the fuel outlet 36.

The operation of the fuel pressure regulator 18 will be described below.

When the pressure of fuel supplied to the injectors 14 through the fuel delivery pipe 12 to the injectors 14 exceeds a preselected limit level, the pressure of fuel flowing through the return pipe 16 to the fuel pressure regulator 18 acts on and urges the valve ball 32 away from the valve seat 34 against the elastic pressure of the plate spring 28, thereby opening the seat opening 40 to establish a fluid communication between the fuel inlet 20 and the fuel outlet 36 of the housing 38. This causes an excess of the pressure of fuel flowing through the fuel delivery pipe 12 to escape from the return pipe 16 into the fuel pressure regulator 18 which is, in turn, released out of the slits 58, 60, 62, and 64 of the plate spring 28 into the fuel tank 10. In this manner, the pressure of fuel supplied through the fuel delivery pipe 12 to the injectors 14 is regulated below the limit level.

As apparent from the above discussion, the fuel pressure regulator 18 has the valve ball 32 disposed downstream of the valve seat 34 within the housing 38, thereby enabling the valve ball 32 to be lifted from the valve seat 34 only by the fuel pressure acting on the valve ball 32 itself without use of a diaphragm which is installed, as discussed in the introductory part of this application, in some of typical fuel pressure regulators to define two chambers hermetically on an upstream side of a valve seat. Specifically, the fuel pressure regulator 18 of this embodiment is simpler in structure than the typical ones using the diaphragm.

Figure 5:
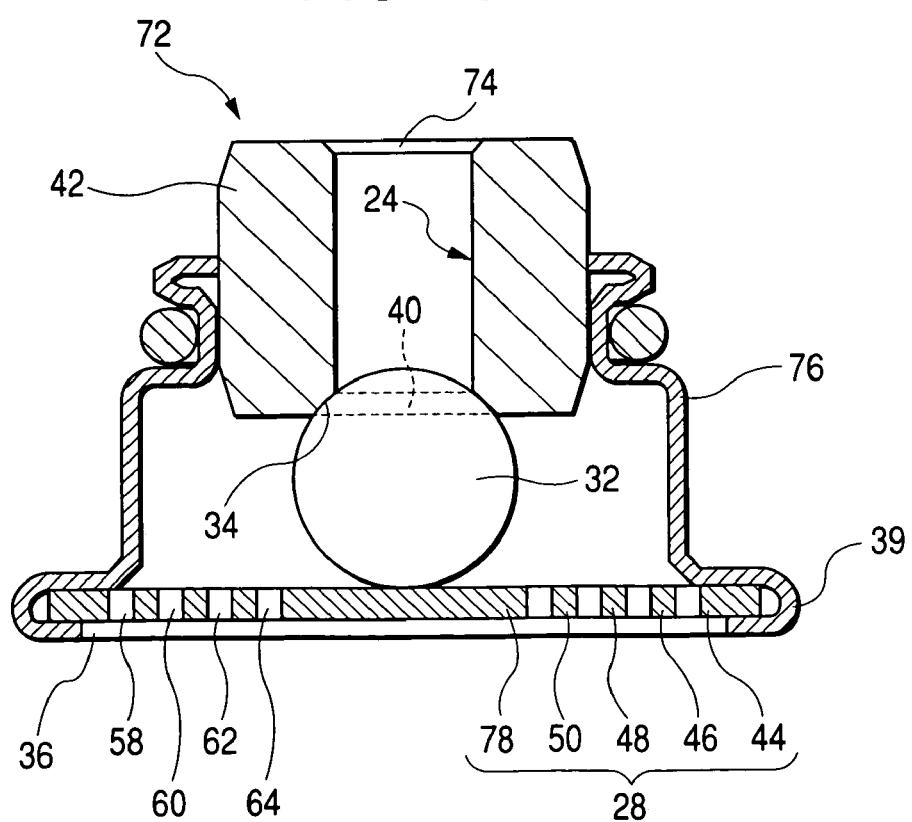
FIG. 5 is a longitudinal sectional view which shows a fuel pressure regulator according to the second embodiment of the invention.

FIG. 5 shows a fuel pressure regulator 72 according to the second embodiment of the invention. The same reference numbers as employed in the first embodiment refer to the same parts, and explanation thereof in detail will be omitted here.

A seat body 42 is so installed within a housing 76 so as to project partially outside the housing 76. The fuel enters a fuel inlet 74 of the seat body 42 from the third pipe line 16, as illustrated in FIG. 1. The spring plate 28 has a central portion 78 in which no opening is formed. Specifically, unlike the first embodiment, the plate spring 28 permits the valve ball 32 from moving laterally (i.e., a direction perpendicular to the thickness of the plate spring 28). The plate spring 28 works to urge the valve ball 32 into coaxial alignment with valve seat 34 of the seat body 42 to close the seat opening 40.

Figure 6:
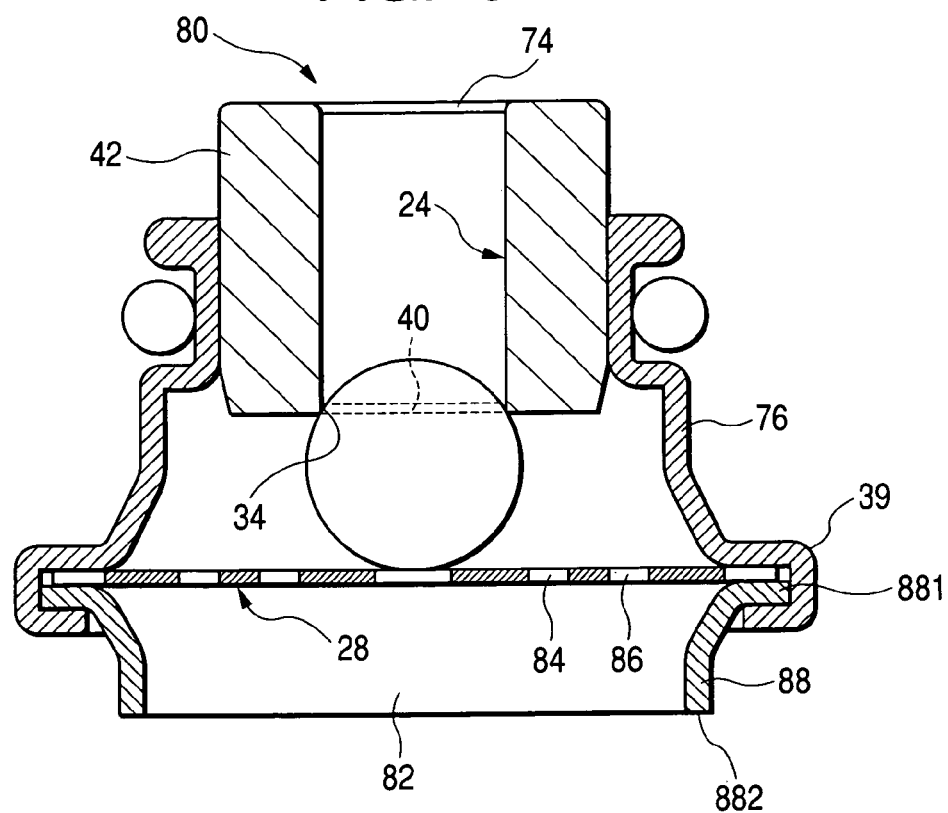
FIG. 6 is a longitudinal sectional view which shows a fuel pressure regulator according to the third embodiment of the invention.

FIG. 6 shows a fuel pressure regulator 80 according to the third embodiment of the invention. The same reference numbers as employed in the second embodiment refer to the same parts, and explanation thereof in detail will be omitted here.

The fuel pressure regulator 80 has a second hollow cylindrical housing 88 disposed downstream of the housing 76. the second housing 88 is of a circular cross section and has an upstream end 881 is fixed together with the plate spring 28 within the outlet end 39 of the housing 76. Such installation is achieved by crimping the outlet end 39 of the housing 76 inwardly. The second housing 88 also has a downstream end 882 which defines a fuel outlet 82. The plate spring 28 has slits 84 and 86 which establish a fluid communication between the fuel outlet 82 and the seat opening 40 when the valve ball 32 is moved away from the valve seat 34. The operation of the fuel pressure regulator is substantially the same as that in the first embodiment, and explanation thereof in detail will be omitted here.

FIGS. 7 to 15 show modifications of the plate spring 28 which may be employed in each of the first to third embodiment, as described above, and following embodiments, as discussed later. The same reference numbers, as employed through FIGS. 7 to 15, refer to the same parts.

Figure 7:
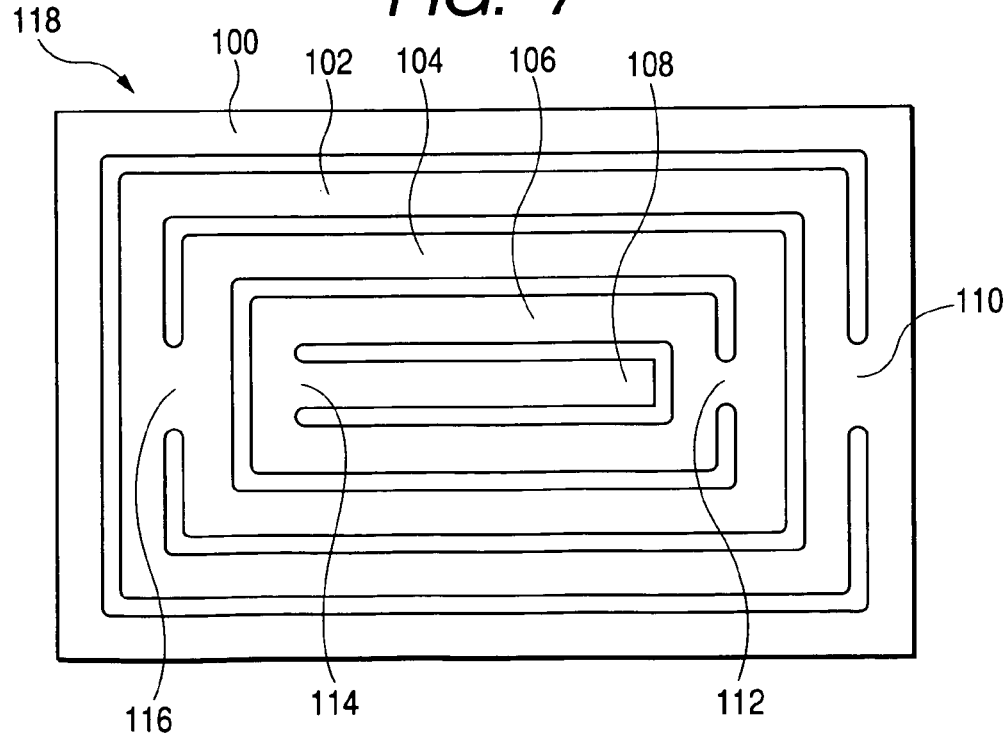
FIG. 7 is a plane view which shows the first modified form of a plate spring used in a fuel pressure regulator.

The spring plate 118, as illustrated in FIG. 7, is made up of a rectangular strips 100, 102, 104, and 106, a straight center strip 108, and joint portions 110, 112, 114, and 116 connecting the strips 100 to 108. The joint portions 110 and 112 are 180 degree opposed to the joint portions 114 and 116 in alignment with the length of the center strip 108, thereby causing the spring plate 28 to be deflected in substantially the same manner, as illustrated in FIG. 4, when the valve ball 32 is moved downstream away from the valve seat 34.

The plate spring 118, like the one shown in FIG. 5, has formed in the center strip 108 no opening serving as a seat in which the valve ball 32 is placed. The valve ball 32 is, thus, retained on the plate spring 118 so as to be allowed to move laterally (i.e., a direction perpendicular to the thickness of the plate spring 118).

Figure 8:
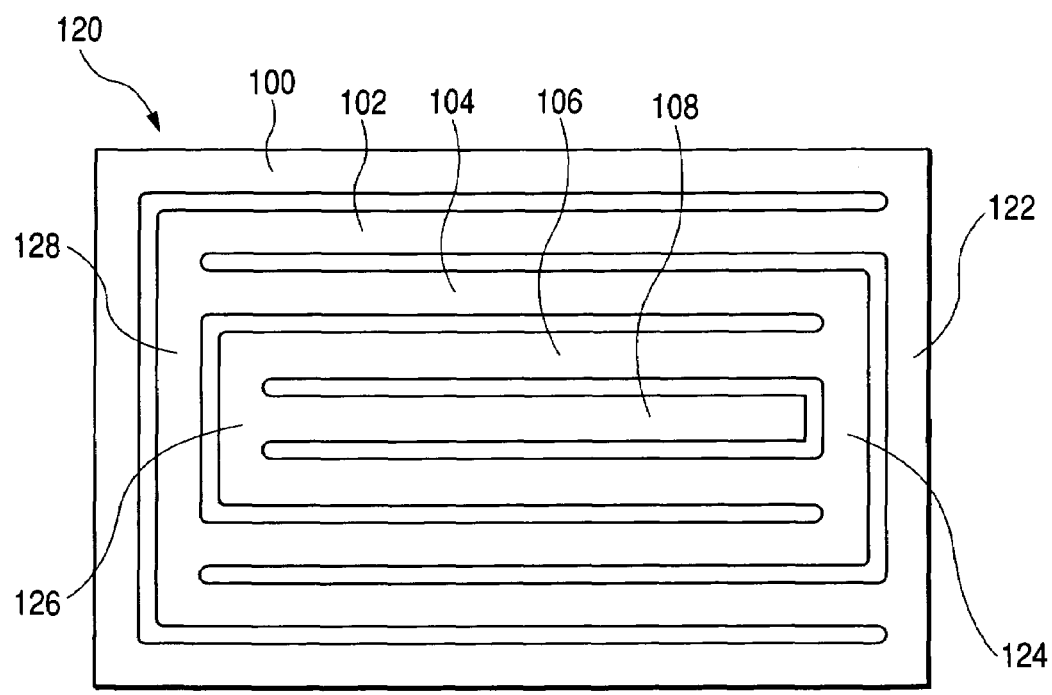
FIG. 8 is a plane view which shows the second modified form of a plate spring used in a fuel pressure regulator.

FIG. 8 shows the plate spring 120 of the second modification.

The plate spring 120 is made up of rectangular strips 100, 102, 104, and 106 and a straight center strip 108 each of which has a side shared with adjacent one of the strips 100 to 108. Specifically, the sides 122, 124, 126, and 128 work as joints connecting the strips 100 to 108 together and extend substantially parallel to each other. The sides 122 and 124 are opposed diametrically to the sides 126 and 128 across the center strip 108, which causes the spring plate 120 to be deflected in substantially the same manner, as illustrated in FIG. 4, in a zigzag form when the valve ball 32 is urged downstream away from the valve seat 34.

Figure 9:
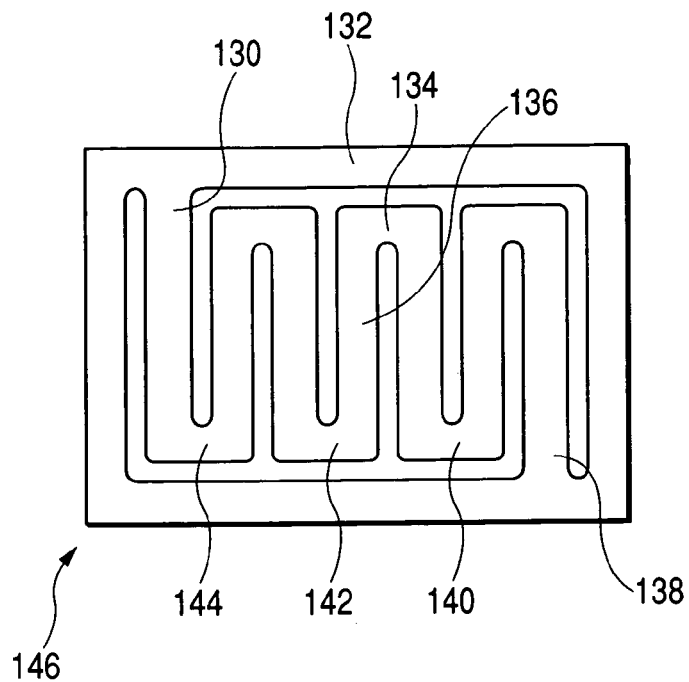
FIG. 9 is a plane view which shows the third modified form of a plate spring used in a fuel pressure regulator.

FIG. 9 shows the plate spring 146 of the third modification.

The plate spring 146 is made up of a rectangular outside strip 132, a straight center strip 136, and S-shaped strips 140 and 144 connecting the center strip 136 and the outside strip 132 together. Outer ends 138 and 130 of the S-shaped strips 140 and 144 are joined to an inner edge of the outside strip 132 and located diagonally of the plate spring 146, while inner ends 134 and 142 of the S-shaped strips 140 and 144 are joined to diametrically opposed portions of an outer edge of the center strip 136. Specifically, the center strip 136 on which the valve ball 32 is placed is retained by the two S-shaped strips 140 and 144 which are 180 degree opposed to each other in a circumferential direction of the plate spring 146, thereby causing the center strip 136 to be kept in orientation substantially perpendicular to the thickness-wise direction of the plate spring 146 when the valve ball 32 is urged downstream away from the valve seat 34 to press the plate spring 146 in the thickness-wise direction thereof. The strips 140 and 144 each have a zigzag shape, thus resulting in an extended length thereof. The strips 140 and 144 are, thus, greater in spring constant for the size thereof.

Figure 10:
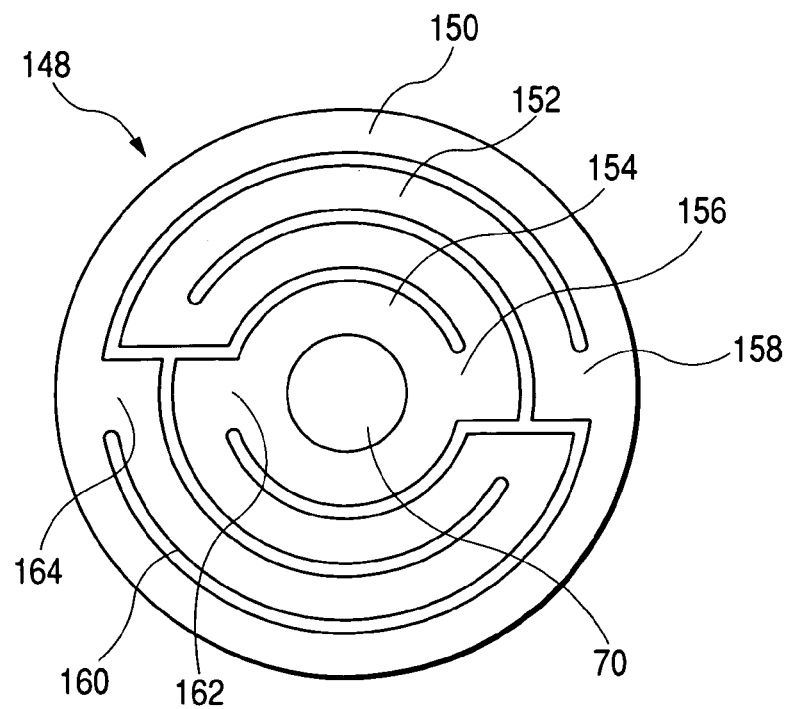
FIG. 10 is a plane view which shows the fourth modified form of a plate spring used in a fuel pressure regulator.

FIG. 10 shows the plate spring 148 of the fourth modification.

The plate spring 148 is made up of a circular outside strip 150, a circular inside center strip 154, and U-shaped strips 152 and 160 connecting the strips 150 and 154 together. Outer ends 158 and 164 of the U-shaped strips 152 and 160 are joined to an inner edge of the outside strip 150 and located diametrically of the plate spring 148, while inner ends 156 and 162 of the U-shaped strips 152 and 160 are joined to diametrically opposed portions of an outer edge of the inside center strip 154. The plate spring 148 has the center opening 70 in which the valve ball 32 is fitted.

Figure 11:
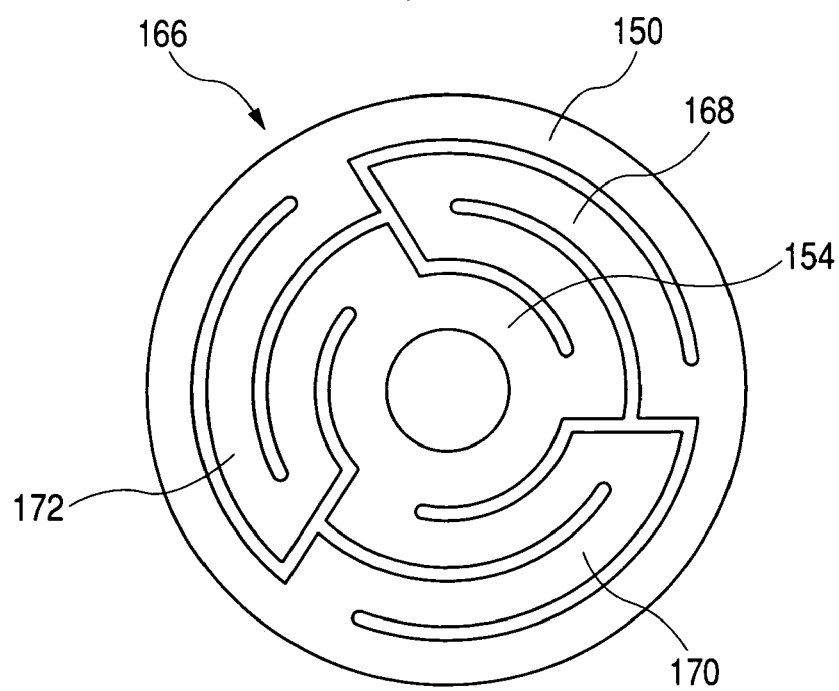
FIG. 11 is a plane view which shows the fifth modified form of a plate spring used in a fuel pressure regulator.

FIG. 11 shows the plate spring 166 of the fifth modification.

The plate spring 166 is made up of the circular outside strip 150, the circular inside center strip 154, and U-shaped strips 168, 170, and 172 connecting the strips 150 and 154 together. The U-shaped strips 168, 170, and 172 have inside ends which are located at equi-angular intervals (i.e., 120°) and retain the center strip 154 on which the valve ball 32 is placed, thereby causing the center strip 154 to be kept in orientation substantially perpendicular to the thickness-wise direction of the plate spring 166 when the valve ball 32 is urged downstream away from the valve seat 34 to press the plate spring 166 in the thickness-wise direction thereof. The strips 168, 170, and 172 each have a zigzag form, thus resulting in an extended length thereof. The strips 168, 170, and 172 are, thus, greater in spring constant for the size thereof.

Figure 12:
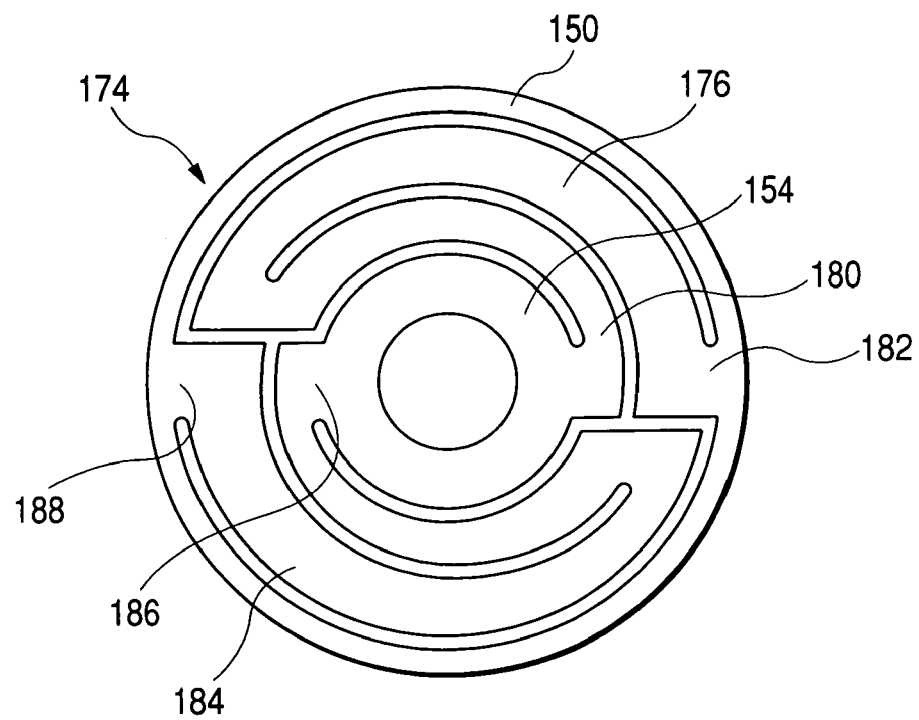
FIG. 12 is a plane view which shows the sixth modified form of a plate spring used in a fuel pressure regulator.

FIG. 12 shows the plate spring 174 of the sixth modification.

The plate spring 174 is made up of a circular outside strip 150, a circular center inside strip 154, and U-shaped strips 176 and 184 connecting the strips 150 and 154 together. The U-shaped strips 176 and 184 have a width increasing gradually from inside ends 180 and 186 to outside ends 182 and 188 thereof. In other words, the rigidity of each of the strips 176 and 184 increases gradually from the inside ends 180 and 186 to the outside ends 182 and 188.

Figure 13:
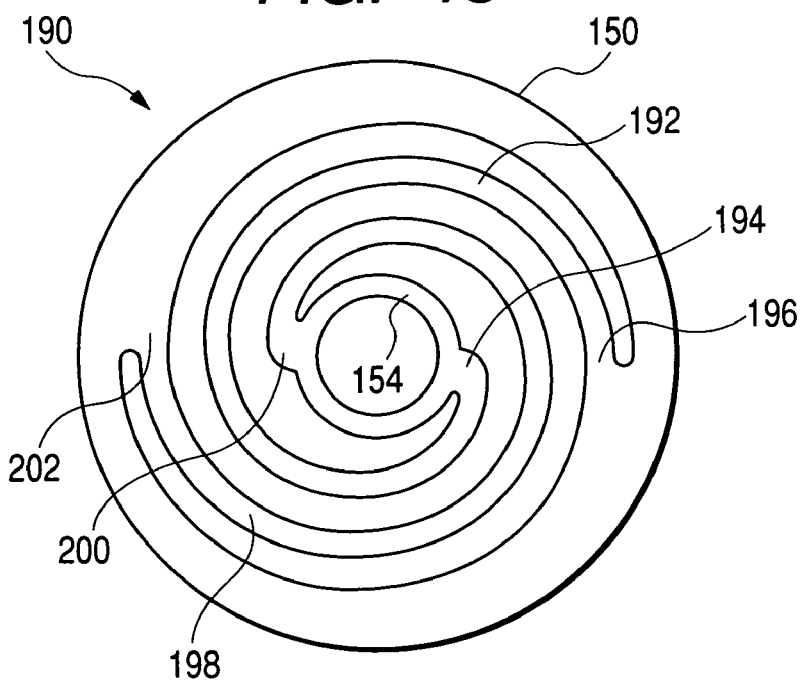
FIG. 13 is a plane view which shows the seventh modified form of a plate spring used in a fuel pressure regulator.

FIG. 13 shows the plate spring 190 of the seventh modification.

The plate spring 190 is made up of a circular outside strip 150, a circular center inside strip 154, and substantially spiral strips 192 and 198 connecting the strips 150 and 154 together. The spiral strips 192 and 198 have outside ends 196 and 202 joined to an inner edge of the outside strip 150 and inside ends 194 and 200 joined to an outer edge of the inside strip 154. Each of the spiral strips 192 and 198 have a longer length by the nature of geometrical shape thereof. The spiral strips 192 and 198 are, thus, greater in spring constant for the size thereof. The spiral strips 192 and 198 have a width increasing from the inside ends 194 and 200 gradually to the outside ends 196 and 202, so that the rigidity thereof increases outwardly.

Figure 14:
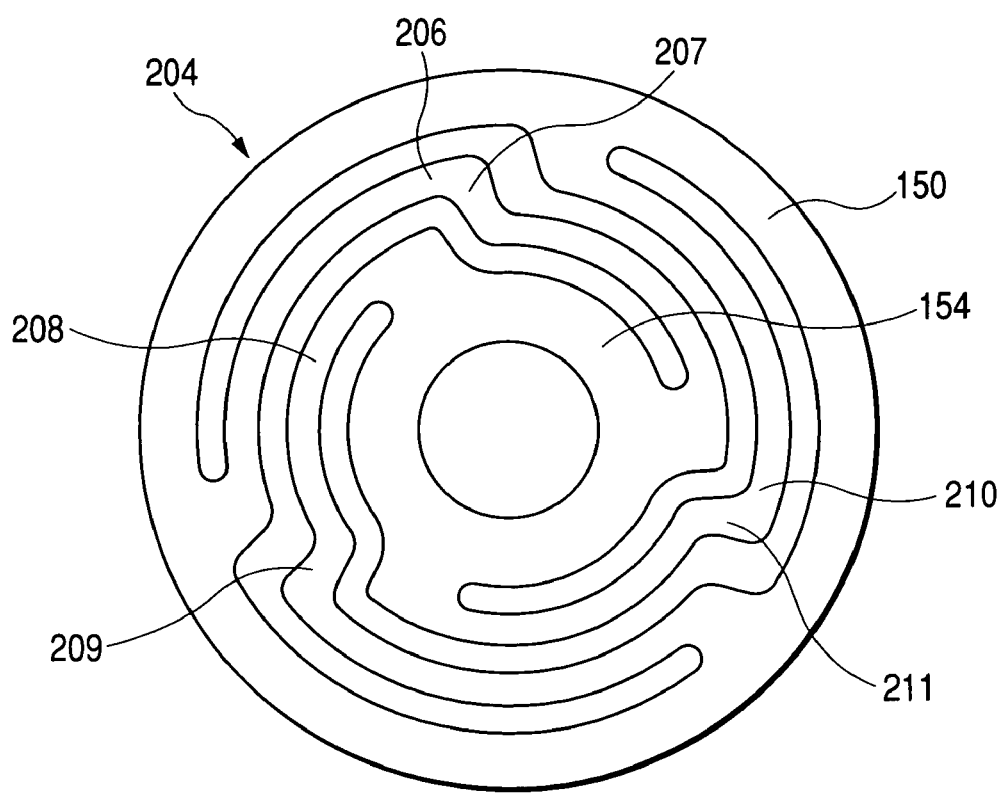
FIG. 14 is a plane view which shows the eighth modified form of a plate spring used in a fuel pressure regulator.

FIG. 14 shows the plate spring 204 of the eighth modification.

The plate spring 204 is made up of a circular outside strip 150, a circular center inside strip 154, and substantially C-shaped strips 206, 208, and 210 connecting the strips 150 and 154 together. The strips 206, 208, and 210 connect with an outer periphery of the inside strip 154 at equi-angular intervals. The strips 206, 208, and 210 have S-shaped curves 207, 209, and 211 and form a spiral spring along with the outside and inside strips 150 and 154. The strips 206, 208, and 210 may have the width that is either constant or inconstant over a length thereof.

Figure 15:
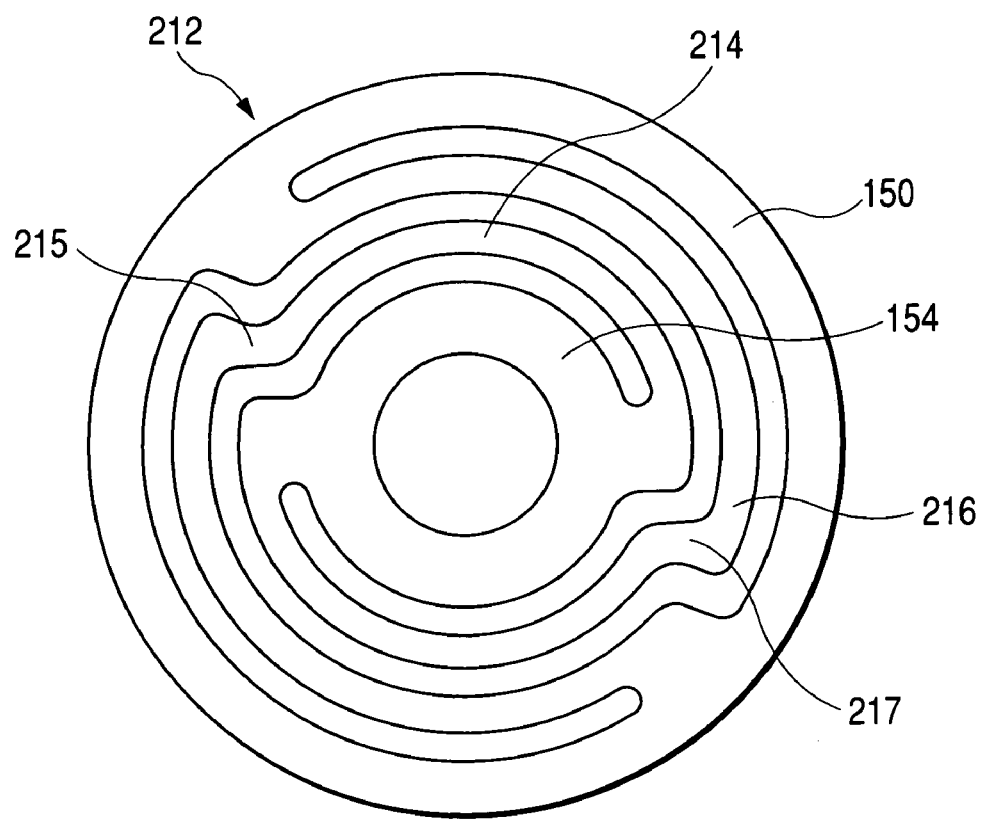
FIG. 15 is a plane view which shows the ninth modified form of a plate spring used in a fuel pressure regulator.

FIG. 15 shows the plate spring 212 of the ninth modification.

The plate spring 204 is made up of a circular outside strip 150, a circular center inside strip 154, and substantially C-shaped strips 214 and 216 connecting the strips 150 and 154 together. The strips 214 and 216 have S-shaped curves 215 and 217, respectively, and form a spiral spring as a whole of the spring plate 204. The strips 214 and 216 may have the width that is either constant or inconstant over a length thereof.

U.S. Pat. No. 5,649,514 and Japanese Patent First Publication No. 2000-45897 disclose fuel pressure regulators for automotive engines. The fuel pressure regulators include a valve body disposed upstream of the flow of fuel within a regulator housing. When the valve body is moved away from a valve seat to open a valve outlet, it will cause the pressure of fuel to drop suddenly to the internal pressure of a fuel tank and also result in a contracted flow of the fuel from outside to inside the valve outlet which decreases the pressure of fuel further. This may result in formation of vapor of the fuel. When such a vapor containing fuel jets out of the pressure regulator into the fuel tank, it develops a pressure fluctuation which is propagated through the fuel with the fuel tank or hits on any parts of the fuel tank, thus resulting noisy vibrations.

The above problem may be eliminated by designing the pressure regulator 18 as discussed below.

Figure 2:
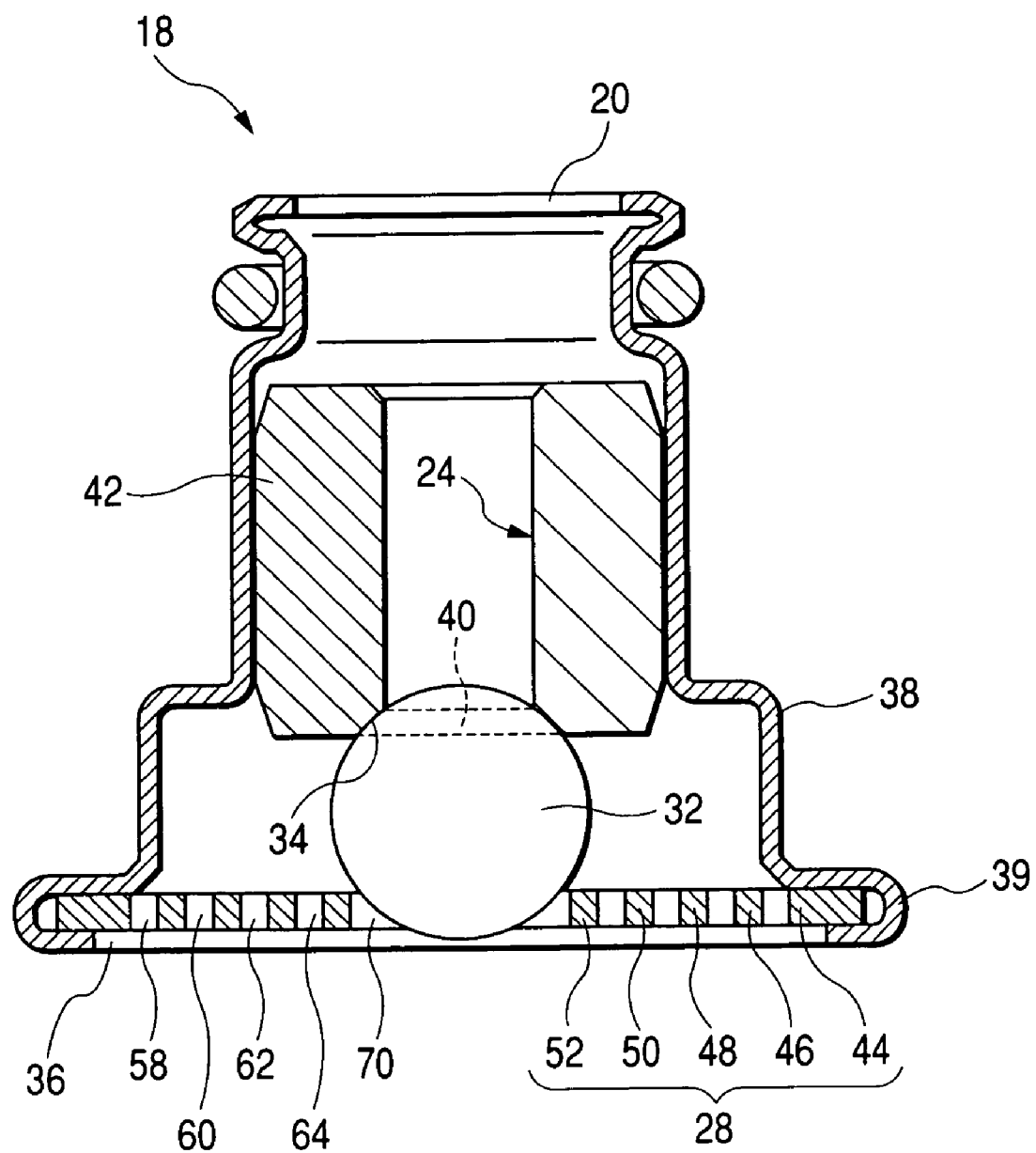
FIG. 2 is a longitudinal sectional view which shows a fuel pressure regulator according to the first embodiment of the invention.

When the valve ball 32 closes the seat opening 40 of the fuel pressure regulator 18, as illustrated in FIGS. 1 and 2, the pressure of fuel working to open the seat opening 40 acts on only a portion of an outer area of the valve ball 32 exposed to the seat opening 40 (which will also be referred to as a pressure-energized area below). In order to avoid the above problem, it is advisable that the spring constant of, for example, the plate spring 28 be selected to be small enough to decrease a change in controlled pressure of the fuel per flow rate of the fuel (i.e., a pressure gradient ΔP, as indicated in equation 1 below.

$$\Delta P = kx/S$$

where k is the spring constant, x is the mount of lift of the valve ball 32, and S is the pressure-energized area of the valve ball 32.

Figure 16:
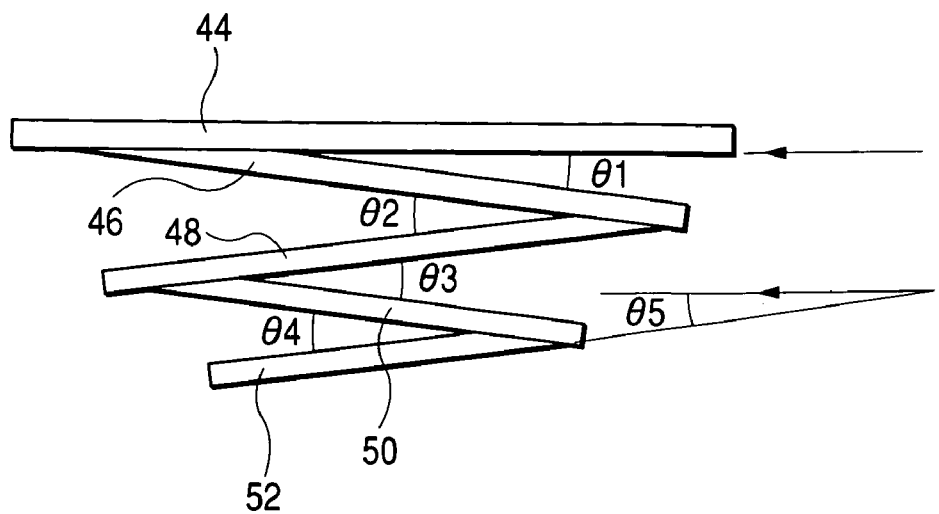
FIG. 16 is a side view which shows inclinations of annular strips of a plate spring when deflected by an excessive fuel pressure.

When the pressure is applied to the center annular strip 52 of the spring plate 28 through the valve ball 32 in the thickness-wise direction of the spring plate 28, it will cause the spring plate 28, as illustrated in FIG. 16, to deformed or deflected elastically. The inclination θ5 of the center annular strip 52 to the outside annular strip 44 is approximated as $$\theta5 = (\theta2 - \theta1) + (\theta4 - \theta3)$$

Figure 3:
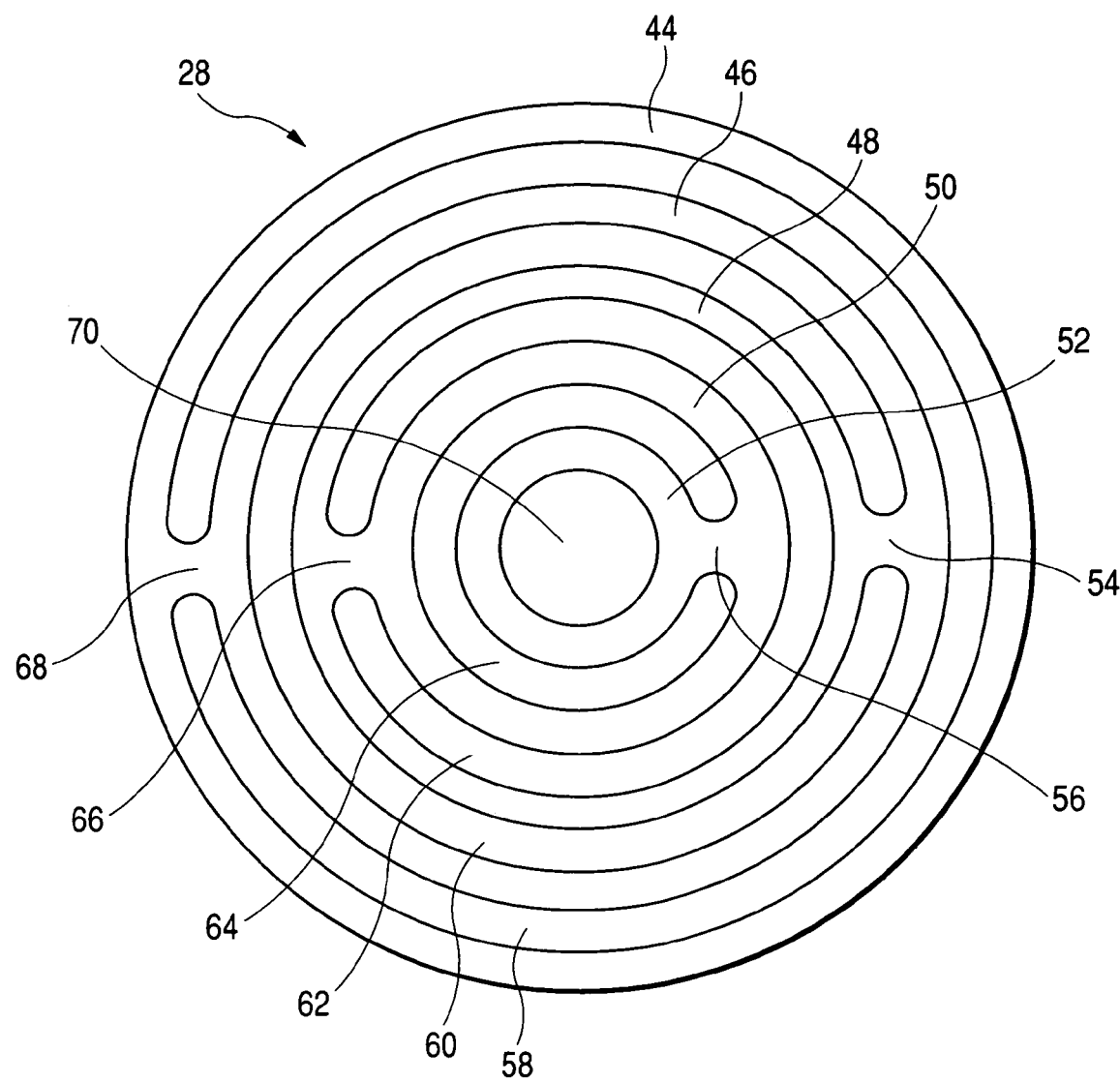
FIG. 3 is a plane view which shows a plate spring used in the fuel pressure regulator, as illustrated in FIG. 2.

An increase in pressure acting on the center annular strip 52 will result in increases in angles θ1 to θ4, but however, the increase in angle θ5 is much smaller than the sum of the increases in angles θ1 to θ4. Specifically, the joint portions 54, 56, 66, and 68 of the spring plate 28, as illustrated in FIG. 3, which join adjacent outer and inner ones of the annular strips 44, 46, 48, 50, and 52 together are arrayed in alignment with each other in a diameter direction of the plate spring 28 so as to allow the spring plate 28 to be deformed into a conical shape in response to pressure perpendicular to a plane of the plate spring 28. This arrangement serves to decrease the rate of increase in angle θ5 resulting from the increase in pressure exerted on the center annular strip 52 through the valve ball 32. This results in orientation of the center annular strip 52 which is nearly parallel to the plane of the spring plate 28.

FIGS. 17(a) and 17(b) illustrate dynamic modes of the plate spring 28 and a comparative example.

In FIG. 17(a), the orientation of a free end (i.e., the center annular strip 52) of the plate spring 28 is kept nearly perpendicular to a center line L of the plate spring 28 extending perpendicular to the thickness of the plate spring 28 during stroke of the valve ball 32 on the spring plate 28. The valve ball 32 moves from the position I to the position II substantially along the center line L extending through the center of the seat opening 40. Even if the plate spring 28 does not have the center opening 70, like the one shown in FIG. 5, and permits the valve ball 32 to move perpendicular to the center line L on the plate spring 28, the free end of the plate spring 28 is kept nearly perpendicular to the center line L in the same manner, as described above, thereby minimizing a shift of the center of the valve ball 32 from the center line L extending through the center of the seat opening 40. Specifically, use of the plate spring 28 in the pressure regulator 18 ensures the stability of movement of the valve ball 32, which results in improved accuracy of regulating an opened area of the seat opening 40 to control the system pressure (i.e., the fuel pressure upstream of the pressure regulator 18).

The comparative example, as illustrated in FIG. 17(b), has a plate spring 92 cantilevered by a regulator housing (not shown). The inclination θ of a free end of the plate spring 92 on which the valve ball 32 is placed increases greatly with an increase in pressure acting on the plate spring 92, as compared with the plate spring 28. Therefore, in a case where the valve ball 32 is not retained firmly by the plate spring 92, the valve ball 32 moves from the position I to the position II, and to the position III regardless of deflection of the free end of the plate spring 92. In a case where the valve ball 32 is retained fixedly by the plate spring 92, the valve ball 32 shifts greatly from the center line L extending through the center of the outlet opening 96 as moving away from the valve seat 94 of the seat body 90.

Figure 18A:
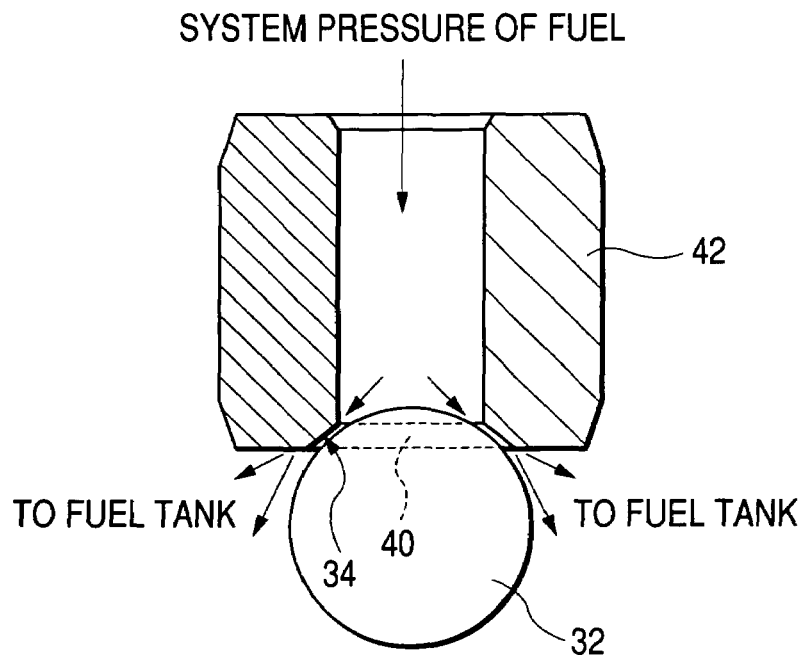
FIG. 18(a) is a partially sectional view which shows a flow of fuel when a valve ball is moved away from a valve seat in a fuel pressure regulator of the invention.

FIG. 18(a) illustrates a dynamic flow of fuel when the seat opening 40 of the seat body 42 is opened. The valve ball 32 is, as described above, disposed downstream of the valve seat 34, to be movable in a downstream direction of the flow of fuel. Thus, when the valve ball 32 is moved away from the valve seat 34, it will cause the fuel to diffuse from inside to outside the seat opening 40, thus resulting in no contracted flow of the fuel on the downstream side of the seat opening 40. This avoids the formation of fuel vapor causing mechanical noises which are objectionable in the conventional structure, as described above.

Figure 18B:
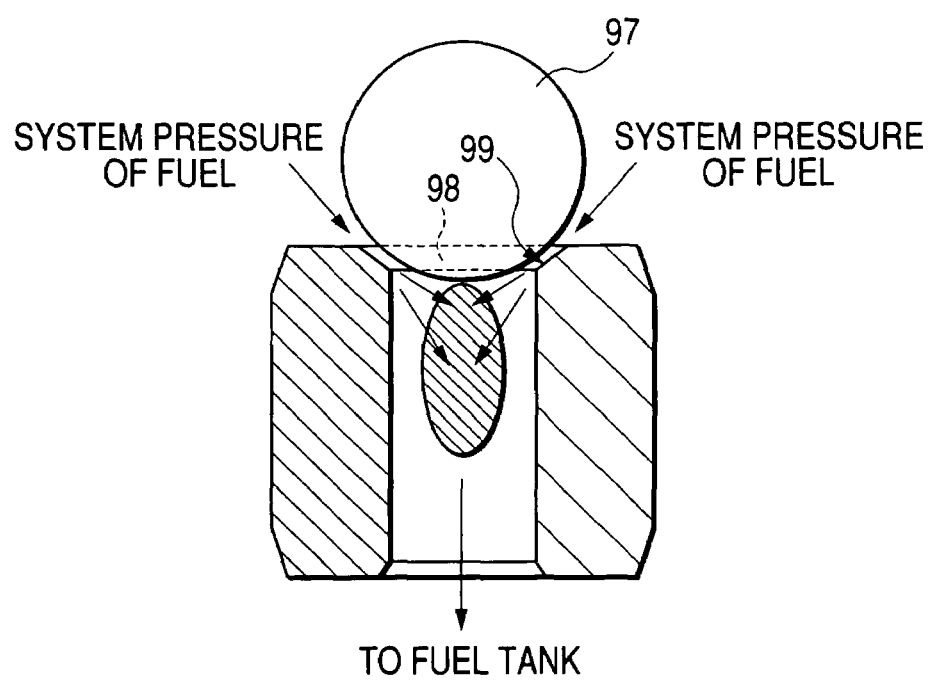
FIG. 18(b) is a partially sectional view which shows a flow of fuel when a fuel pressure regulator of a comparative example is opened.

FIG. 18(b) illustrates the conventional structure, as taught in the above publications, in which the valve ball 97 is disposed upstream of the valve seat 99. When the valve ball 97 is lifted away from the valve seat 99, it will result in a contracted flow of the fuel from outside to inside the outlet opening 98, which accelerates a drop in pressure of the fuel downstream of the outlet opening 98 leading to the formation of fuel vapor.

Figure 19:
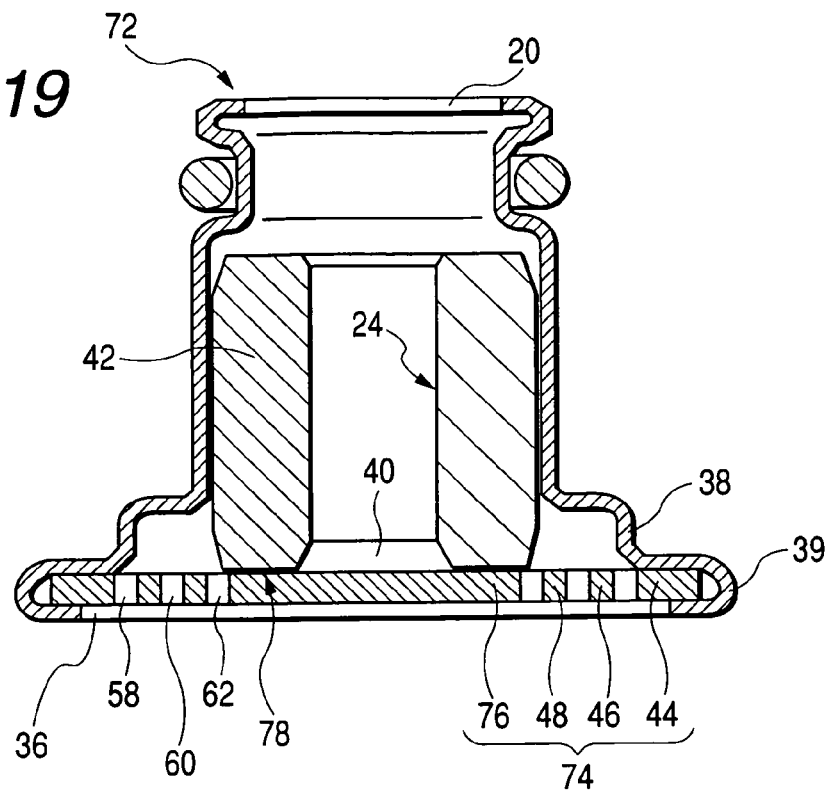
FIG. 19 is a longitudinal sectional view which shows a fuel pressure regulator according to the fourth embodiment of the invention.

FIG. 19 shows a fuel pressure regulator 72 according to the fourth embodiment of the invention which is different from the first to third embodiment, as illustrated in FIGS. 2, 5, and 6, in that the plate spring 74 itself works as a valve to open or close the seat opening 40 of the seat body 42.

The seat body 42 has formed on an annular end thereof a valve seat 78. The plate spring 74 includes three annular strips 44, 46, and 48, and a flat center disc 76 which is joined directly to the annular strip 48 and has no opening. The housing 38 retains the plate spring 74 so that the center disc 76 may abut the valve seat 78 of the seat body 24 to close the seat opening 40 hermetically. Other arrangements are identical with those in the one of FIG. 3, and explanation thereof in detail will be omitted here.

Figure 20:
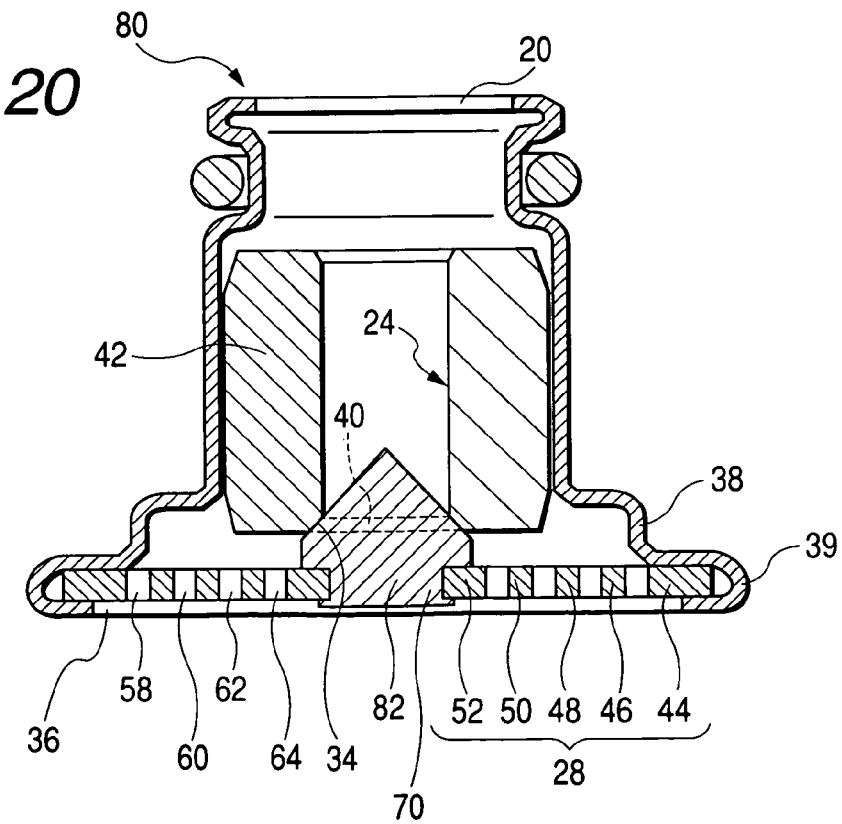
FIG. 20 is a longitudinal sectional view which shows a fuel pressure regulator according to the fifth embodiment of the invention.

FIG. 20 shows a fuel pressure regulator 80 according to the fifth embodiment of the invention.

The fuel pressure regulator 80 has a conical valve body 82 which is fitted firmly in the center opening 70 of the plate spring 28. Other arrangements are identical with those in the first embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the plate spring, as described in each of the above embodiments, includes an outer peripheral portion (e.g., the annular strip 44 in FIG. 3) fixed to the housing 38 to be stationary, a center portion (e.g., the annular strip 52 in FIG. 3) retained to be movable, and a plurality of annular strips (e.g., the annular strips 46, 48, and 50 in FIG. 3) disposed between the outer peripheral portion and the center portion, but however, it may have only one annular portion between the outer peripheral portion and the center portion. In this case, the plate spring may have at least one outside joint portion (e.g., the joint portion 66 or 68 in FIG. 3) joining the outer peripheral portion and the annular portion and at least one inside joint portion (e.g., the joint portions 54 or 56 in FIG. 3) joining the center portion and the annular portion. The outside and inside portions are located diametrically opposed to each other across the center portion. In other words, the outside and inside portions are 180° opposed to each other across the center portion.

What is claimed is:

1. A fuel pressure regulator for an internal combustion engine comprising:
   a seat member having a seat opening, and a valve seat formed around the seat opening, the seat opening leading to a fuel delivery pipe through which fuel pumped out of a fuel tank is delivered to an internal combustion engine;
   a valve member disposed downstream of the valve seat of said seat member in a flow direction of the fuel;
   a plate spring working to urge said valve member into abutment with the valve seat to close the seat opening of said seat member and to permit said valve member to be moved away from the valve seat to open the seat opening of said seat member when a pressure of the fuel flowing through the flow path of said seat member that is higher than a preselected limit level acts on said valve member, thereby regulating the pressure of the fuel delivered to the internal combustion engine to below the preselected limit level, said plate spring including an outer portion retained to be stationary with respect to the seat member, an inner portion that is movable with respect to the seat member, at least one annular portion retained between the outer portion and the inner portion, and an outside and an inside joint portions, the outside joint portion connecting the outer portion and the annular portion, the inside joint portion connecting the annular portion and the inner portion, the outside and inside joint portions being opposed diametrically to each other across the center of the plate spring; and
   a second annular portion disposed between said annular portion and the outer portion, said second annular portion being greater in rigidity than said annular portion.

2. A fuel pressure regulator as set forth in claim 1, wherein said valve member is in abutment with the inner portion of said plate spring so as to be movable in a direction substantially perpendicular to a line extending in a thickness-wise direction of said plate spring.

3. A fuel pressure regulator for an internal combustion engine comprising:
   a seat member having a seat opening, and a valve seat formed around the seat opening, the seat opening leading to a fuel delivery pipe through which fuel pumped out of a fuel tank is delivered to an internal combustion engine;
   a valve member disposed downstream of the valve seat of said seat member in a flow direction of the fuel; and
   a plate spring working to urge said valve member into abutment with the valve seat to close the seat opening of said seat member and to permit said valve member to be moved away from the valve seat to open the seat opening of said seat member when a pressure of the fuel flowing through the flow path of said seat member that is higher than a preselected limit level acts on said valve member, thereby regulating the pressure of the fuel delivered to the internal combustion engine to below the preselected limit level, said plate spring including an outer portion retained to be stationary with respect to the seat member, a center portion abutting said valve member and that is movable with respect to the seat member, and at least two spring portions retained between the outer portion and the center portion, each of the spring portions having a first end joined to the outer portion and a second end joined to the center portion, the second ends being joined to an outer periphery of the center portion at equi-angular intervals,
   wherein each of said spring portions has rigidity which increases from the second end to the first end.

4. A fuel pressure regulator as set forth in claim 3, wherein said valve member is in abutment with the center portion of said plate spring so as to be movable in a direction substantially perpendicular to a line extending in a thickness-wise direction of the center portion.

5. A fuel pressure regular as set forth in claim 3, wherein the spring portions of said plate spring are of a zigzag shape.

6. A fuel pressure regulator as set forth in claim 3, wherein the spring portions of said plate spring are of a spiral shape.

7. A fuel pressure regulator for an internal combustion engine comprising:
   a seat member having a seat opening, and a valve seat formed around the seat opening, the seat opening leading to a fuel delivery pipe through which fuel pumped out of a fuel tank is delivered to an internal combustion engine;
   a valve member disposed downstream of the valve seat of said seat member in a flow direction of the fuel, said valve member being adapted to abut on the valve seat to close the seat opening and to be moved upon application of pressure of the fuel thereto to open the seat opening for regulating the pressure of the fuel delivered to the internal combustion engine;
   a plate spring working to urge said valve member into abutment with the valve seat to close the seat opening of said seat member, said plate spring including an outer portion retained to be stationary, an inner portion retained to be movable, at least one annular portion retained between the outer portion and the inner portion, and an outside and an inside joint portions, the outside joint portion connecting the outer portion and the annular portion, the inside joint portion connecting the annular portion and the inner portion, the outside and inside joint portions being opposed diametrically to each other across the center of the plate spring; and
   a second annular portion disposed between said annular portion and the outer portion, said second annular portion being greater in rigidity than said annular portion.

8. A fuel pressure regulator for an internal combustion engine comprising:
   a seat member having a seat opening, and a valve seat formed around the seat opening, the seat opening leading to a fuel delivery pipe through which fuel pumped out of a fuel tank is delivered to an internal combustion engine;
   a valve member disposed downstream of the valve seat of said seat member in a flow of the fuel, said valve member being adapted to abut on the valve seat to close the seat opening and to be moved upon application of pressure of the fuel thereto to open the seat opening for regulating the pressure of the fuel delivered to the internal combustion engine;

a plate spring working to urge said valve member into abutment with the valve seat to close the seat opening of said seat member, said plate spring including an outer portion retained to be stationary, a center portion abutting said valve member and retained to be movable, and at least two spring portions retained between the outer portion and the center portion, each of the spring portions having a first end joined to the outer portion and a second end joined to the center portion, the second ends being joined to an outer periphery of the center portion at equi-angular intervals; and wherein each of said spring portions has rigidity which increases from the second end to the first end.

* * * * *